United States Patent [19]

Yeargin

[11] Patent Number: 5,075,946
[45] Date of Patent: Dec. 31, 1991

[54] APARATUS FOR SECURING A DROP HOSE TO A FITTING

[76] Inventor: Steven A. Yeargin, 23 Lude Johnson Blvd., Campobello, S.C. 29322

[21] Appl. No.: 656,450
[22] Filed: Feb. 19, 1991
[51] Int. Cl.⁵ ............................................ B23P 19/04
[52] U.S. Cl. ........................................................ 29/237
[58] Field of Search ............... 29/237, 235, 252, 282, 29/280

[56] References Cited

U.S. PATENT DOCUMENTS 2,916,812 12/1959 Milo ............................................. 29/237
4,418,458 12/1983 Hunter ........................................ 29/237
4,535,822 8/1985 Rogers ....................................... 29/237

Primary Examiner—Robert C. Watson
Attorney, Agent, or Firm—Bailey & Hardaway

[57] ABSTRACT

Apparatus is illustrated for fastening a petroleum delivery drop hose having looped reinforcement to a fitting wherein a clamping member includes a pair of opposed grating members A and B which may be opened and closed to receive and to exert a gripping force on the hose, by receiving the looped reinforcement between transverse grating bars, resisting longitudinal movement during insertion of the fitting in an open end of the hose.

6 Claims, 3 Drawing Sheets

APARATUS FOR SECURING A DROP HOSE TO A FITTING

BACKGROUND OF THE INVENTION

This invention relates to apparatus for fastening a petroleum delivery drop hose, having looped reinforcement members extending thereabout along its length, to a fitting having a substantially cylindrical receiving member upon which an open end of the hose is inserted.

Drop hoses and the like are illustrated wherein longitudinally spaced reinforcing loops extend the entire length thereof. Such reinforcement is provided so as to avoid excessive hose wall thicknesses which would result in an expensive drop hose which would be unmanageable from a weight standpoint. Such drop hoses are sold under the Trademark SPIRALITE 5000 by Carolina Tank Service, Inc., 8342 Fairforest Rd., P.O. Box 4727, Spartanburg, S.C. 29305. While the invention has been described herein in connection with reinforcement such as helical loops, the invention is useful with other ribbed reinforcement carried by synthetic rubber tubing and integrally secured thereto to form a reinforced drop hose and the like.

At present drop hoses are attached on each end to suitable fittings by main force and effort. The hoses are often hammered as by mallets on to the cylindrical fittings. Such efforts are laborious and result in damage and wear upon the hoses and fittings.

Accordingly, it is a important object of the present invention to provide a securement device for effectively positioning the hose while forcefully joining same to respective end fittings.

Another important object of the invention is to provide apparatus for securing a drop hose to a fitting such as may be carried on a petroleum delivery truck for readily securing the fitting to the reinforcement drop hose at either end.

Another important object of the invention is to provide an effective gripping means which is adjustable to accommodate various size hoses and which is further adjustable longitudinally with respect to power operated means for moving the fitting relative to the hose for insertion of the fitting upon the hose.

SUMMARY OF THE INVENTION

It has been found that gripping means may be provided for the securement of a spirally reinforced drop hose for the delivery of petroleum products through the use of opposing grating members having longitudinally spaced transverse rods for insertion between loops of the spiral hose reinforcement positively securing the hose against longitudinal movement while power operated means forcefully unite the hose with fittings which are inserted within the respective ends of the hose.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1A is a perspective view illustrating an end fitting for the hose in position for forceful movement by a support carried by a fluid cylinder;

DESCRIPTION OF A PREFERRED EMBODIMENT

Figure 1:
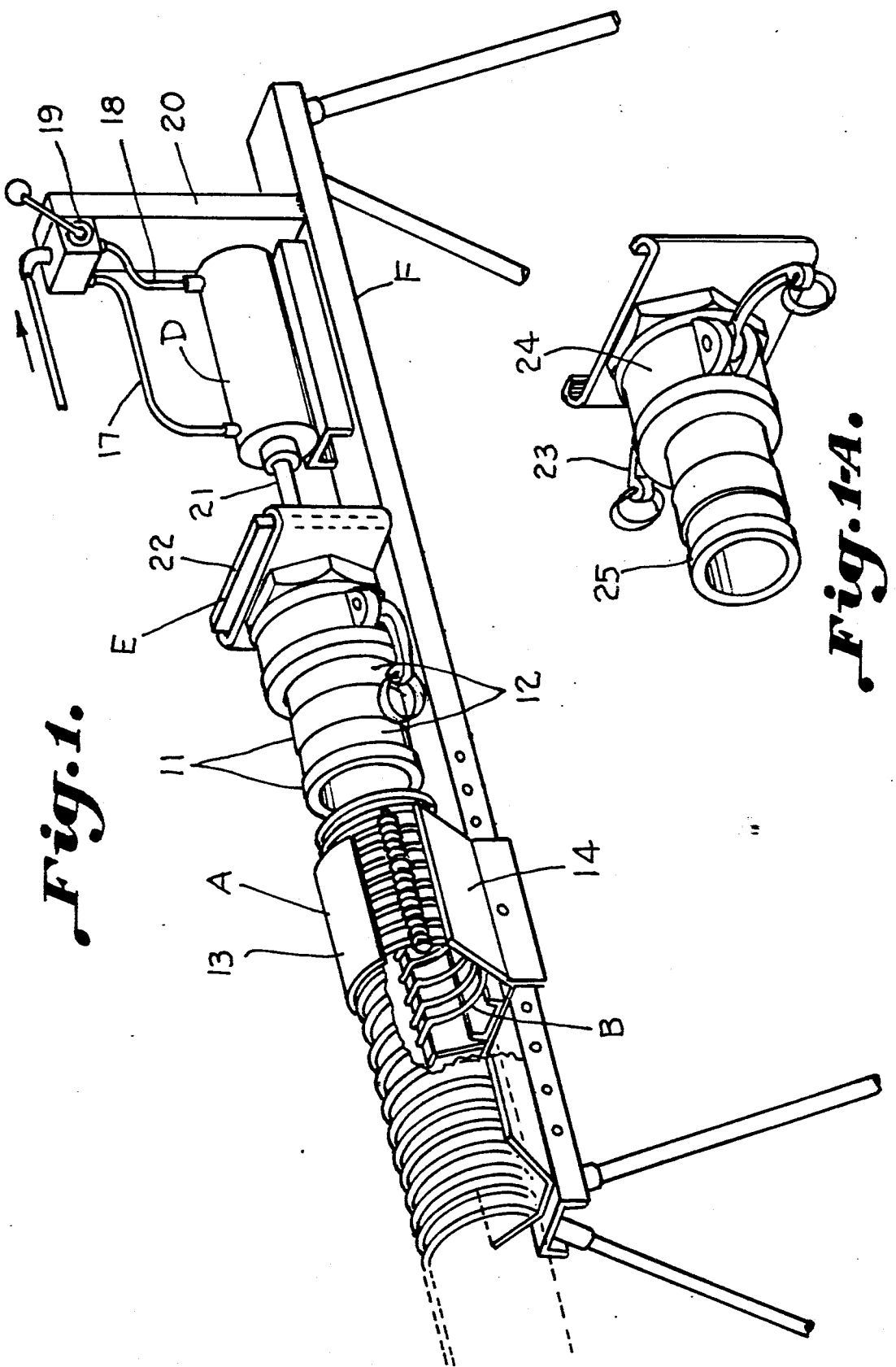
FIG. 1 is a perspective view illustrating an apparatus for securing a drop hose to a fitting in accordance with the present invention wherein a gripping member is provided in opposed grating halves each constructed with transverse rib or bar members capable of interfitting between the reinforcement loops of the hose.
Figure 2:
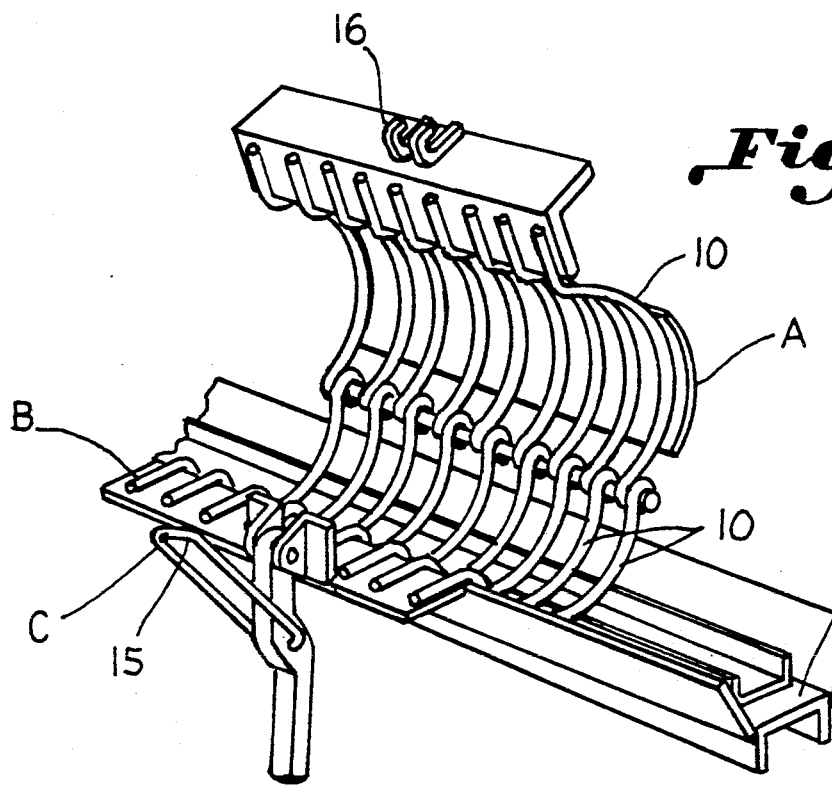
FIG. 2 is a perspective view illustrating one of the grating halves constructed in accordance with the present invention open to accommodate reception of an end of a petroleum drop hose.
Figure 3:
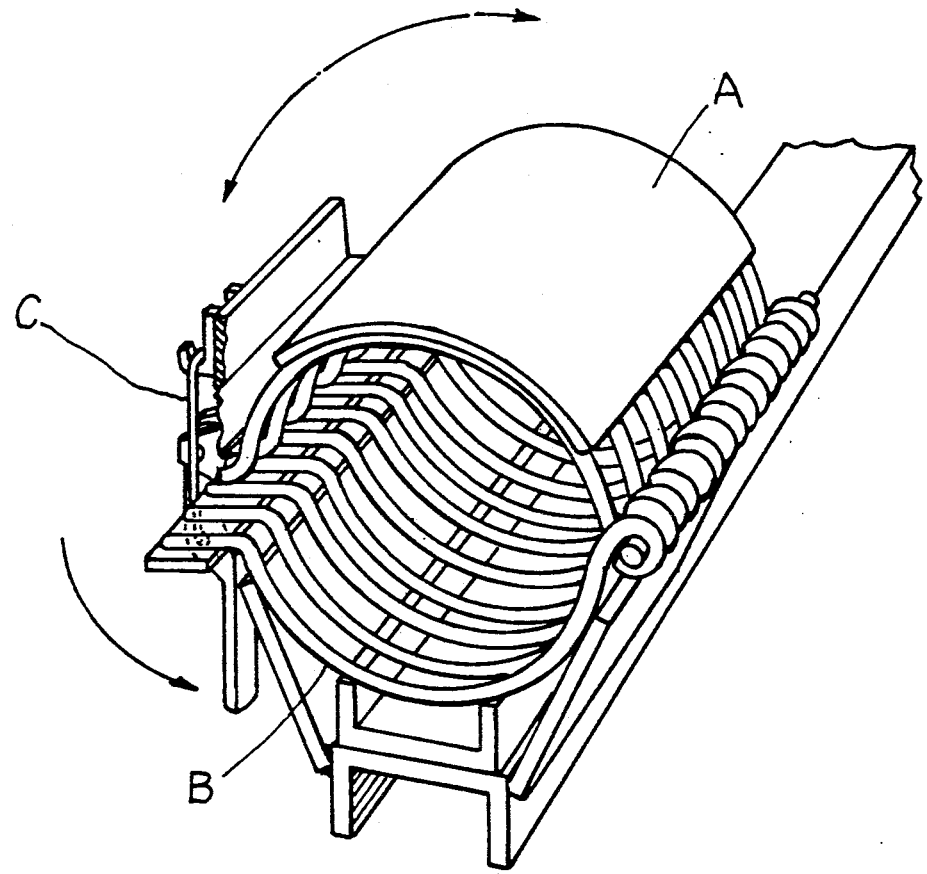
FIG. 3 is a perspective view looking toward the open end of a gripper constructed in accordance with the present invention upon an elongated longitudinal mounting bar shown in cross section.

The drawings illustrate apparatus for connecting a petroleum delivery drop hose, having looped reinforcement members extending thereabout along its length, to a fitting having a substantially cylindrical receiving member upon which an end of said hose is inserted. A clamping member includes a pair of opposed grating members A and B, each having a plurality of longitudinally spaced transverse bars. The spacing is such as to accommodate the reinforcement loops between adjacent bars to exert a gripping force on the hose for resisting longitudinal movement between the hose and the clamping member. Fastening apparatus C secures the opposed grating members together longitudinally of the hose in clamping relation. An extensible member in the form of a fluid operated cylinder D is positioned opposite an open end of the hose in longitudinal spaced alignment with the clamping member. A support E is carried by the linear actuator positioning the fitting opposite the hose and forcefully moving the fitting in relation to said hose. Thus, the hose may be forced upon the fitting by forcefully moving the fitting in relation toward and away from the hose. Preferably, the grating members are pivotally connected adjacent one side for opening the clamping member to receive the hose. Preferably also, threadably adjustable fastening means are provided to secure the grating members in closed clamping relation to the hose adjacent an opposite side thereof for accommodating hoses of various sizes. A longitudinal mounting bar F is provided in longitudinal alignment with the clamp and the cylinder carrying said clamping member and the extensible member. Means may be carried by the bar including a slidable support for the clamping member for adjusting the distance between the clamping member and the extensible member.

The opposed grating members A and B which form the clamping members each include a plurality of longitudinally spaced transverse bars 10. The bars are arcuate and are bowed outwardly so as to conform generally to the space between reinforcement loops on the drop hoses and are shown positioned between the looped spiral reinforcement members 11. The bars 10 are carried within the recesses 12 between the reinforcement loops 11. The bars are suitably joined in fixed relation by respective arcuate metal plates 13 and 14 which conform thereto to create an integral grating structure. A clamping luggage latch is illustrated as serving as the fastening apparatus C and includes the usual latch hook 15 and latch member 16.

Figure 5:
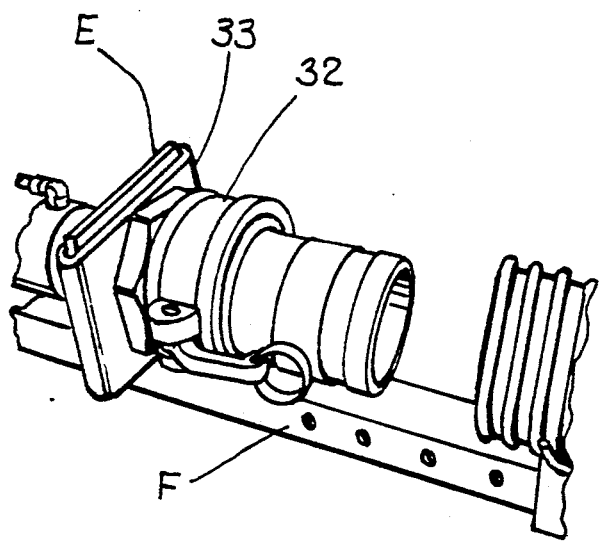
FIG. 5 is a perspective view illustrating a modified form of the invention including a support fixture preparatory to insertion of the hose fixture into the hose.
Figure 4:
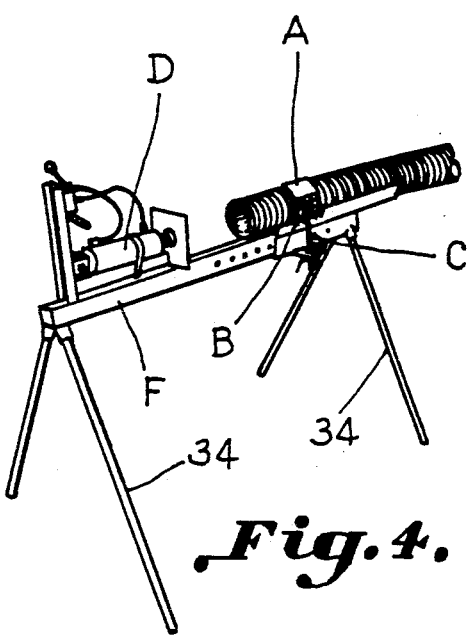
FIG. 4 is a perspective view illustrating a modified form of the invent ion wherein the assembly, hose and clamping member are carried upon a longitudinal mounting bar carried upon legs for positioning a power operated linear actuator and the like in the form of a cylinder for forcefully moving a fixture into the hose.
Figure 6:
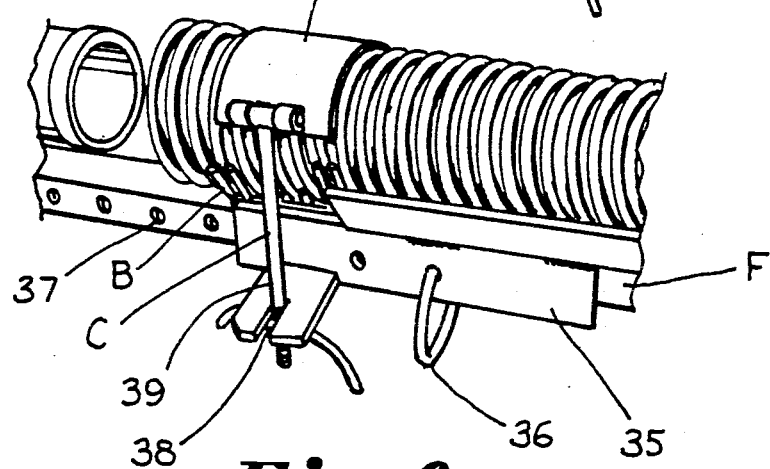
FIG. 6 is a perspective view illustrating a clamping member positioned for longitudinal adjustment as well as adjusting means for accommodating hoses of various sizes in the clamping member in accordance with the modified form of the invention.

An extensible member is provided in the form of a fluid operated cylinder D or other suitable linear actuator. The cylinder is illustrated as being supplied with fluid at either end by lines 17 and 18 from a control valve 19 which is carried by a vertical standard 20 which is in turn carried by the longitudinal mounting bar F. The fluid cylinder is preferably operated by pressurized air and includes a piston rod 21 which extends therefrom and carries the support member E which includes a plate 22 carried at an end of the piston rod 21. The fitting includes a hose coupler fitting in the form of a female member having lever actuated securement means 23. The fitting has a coupler member 24 which is secured to the male hose coupling mounting member which may be carried by a tank (not shown). A cylindrical end 25 may taper outwardly to form a small end for initial insertion into the open end of the hose. Preferably, the grating members A and B are connected on one end by a hinge pin 30 and are carried by the mounting bar F. A modified form of the invention is illustrated in FIGS. 4, 5 and 6 wherein a male fitting 32 has a bracket 33 carried thereon for reception upon the plate E. FIG. 4 illustrates a mounting bar F which is carried by legs 34.

FIG. 6 illustrates a slidable frame member 35 which is longitudinally movable along the bar F and is fastened as by a pin 36 which passes through selected openings 37 in the bar. FIG. 6 further illustrates an alternate form of the fastening means wherein a threaded member 37 has a threaded nut 38 which pulls the halves A and B of the clamping members into clamping relation in engagement with the drop hose to limit longitudinal movement thereof. The threaded member 37 and nut serve to adjustably clamp several sizes of hose against relative longitudinal movement.

While a preferred embodiment of the invention has been described using specific terms, such description is for illustrative purposes only, and it is to be understood that changes and variations may be made without departing from the spirit or scope of the following claims.

What is claimed is:

1. Apparatus for connecting a petroleum delivery drop hose to a fitting having a substantially cylindrical receiving member upon which an end of said hose is inserted, said drop hose having spaced looped reinforcement members extending thereabout along the length thereof, comprising:

a clamping member including a pair of opposed grating members each having a plurality of longitudinally spaced transverse bars;

said spacing being such as to accommodate said looped reinforcement between adjacent bars to exert a gripping force on said hose for resisting longitudinal movement between said hose and said clamping member;

fastening apparatus securing said opposed grating members together longitudinally of said hose in clamping relation thereto;

a power operated extensible member opposite an open end of said hose in longitudinal spaced alignment with said clamping member; and a support carried by said extensible member positioning said fitting opposite said hose and forcefully moving said fitting in relation to said hose;

whereby said hose may be connected upon said fitting by forcefully moving the fitting in relation toward and away from said hose.

2. The structure set forth in claim 1 wherein said extensible member is a fluid operated cylinder having a rod carrying said support.

3. The structure set forth in claim 2 wherein threadably adjustable fastening means secure said grating members in closed clamping relation to said hose adjacent an opposite side thereof for accommodating hoses of various sizes.

4. The structure set forth in claim 3 including a longitudinal mounting bar in longitudinal alignment with said clamping members and said cylinder carrying said clamping member and said extensible member, and means carried by said bar adjusting the distance between the clamping member and said extensible member.

5. The structure set forth in claim 4 wherein said mounting bar is carried by spaced legs.

6. The structure set forth in claim 5 wherein said means adjusting the distance includes a support for said clamping member slidably mounted on said mounting bar.

* * * * *